Feb. 24, 1959 J. L. JEANNERET 2,874,600
ARRANGEMENT FOR SUPPORTING A WORK PIECE ON THE
BACK CENTER OF A MACHINE-TOOL
Filed March 22, 1956 2 Sheets-Sheet 1

INVENTOR
JULES LOUIS JEANNERET

Feb. 24, 1959   J. L. JEANNERET   2,874,600
ARRANGEMENT FOR SUPPORTING A WORK PIECE ON THE
BACK CENTER OF A MACHINE-TOOL
Filed March 22, 1956   2 Sheets-Sheet 2
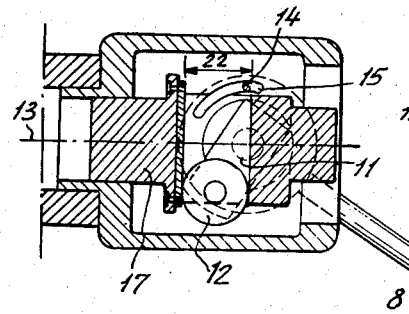
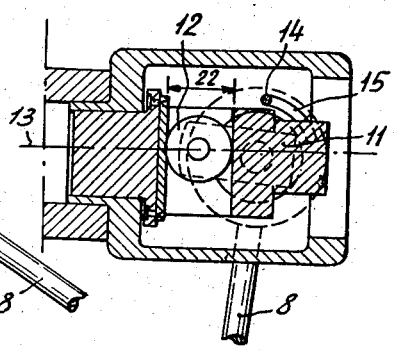
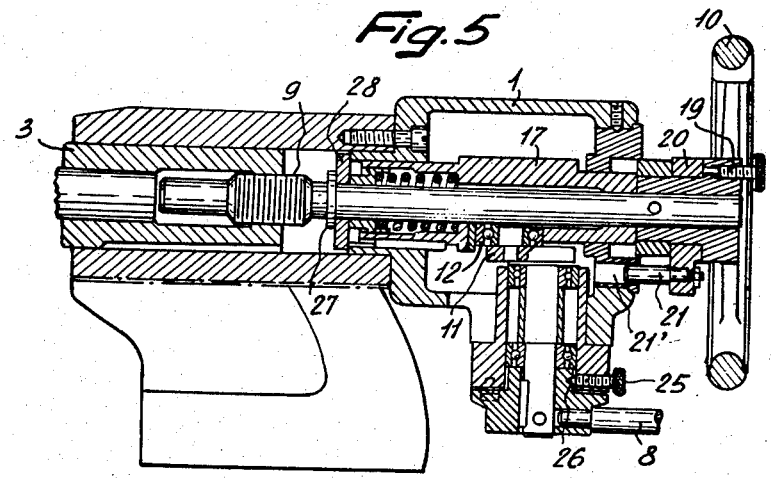
INVENTOR
JULES LOUIS JEANNERET
ATTYS.

United States Patent Office 2,874,600
Patented Feb. 24, 1959

2,874,600

ARRANGEMENT FOR SUPPORTING A WORK PIECE ON THE BACK CENTER OF A MACHINE-TOOL

Jules Louis Jeanneret, Niort, France

Application March 22, 1956, Serial No. 573,223

Claims priority, application France April 14, 1955

8 Claims. (Cl. 82—31)

My invention has for its object an arrangement for the rapid clamping of a piece of work on the back center of a lathe or the like machine-tool. Whereas in conventional machine-tools, the operator can act only on a hand-wheel for the progression of the sheath or sleeve carrying the back center of the movable tailstock, I have provided in accordance with my invention an auxiliary arrangement which allows clamping the piece of work in an easy and speedy manner. This arrangement is constituted by a plunger fitted inside a casing rigid with the movable tailstock and adapted to make the screw controlling the dead center progress longitudinally in its clamping direction, the plunger being controlled by a roller or the like member acting in parallelism with the axis of the dead center on a point of the plunger adjacent said axis under the control of a hand-operable eccentric member rotating round an axis perpendicular to the axis of the dead center.

According to an auxiliary feature of my invention, I provide means for holding fast either the conventional hand-wheel when operating the high-speed clamping arrangement according to my invention or the latter when the conventional hand-wheel is being used.

I have illustrated by way of example in the accompanying drawings a preferred embodiment of the arrangement according to my invention as applied to a slide lathe. In said drawings:

Fig. 3 is a horizontal partial cross-section, through line 3—3 of Fig. 2, of the high speed clamping members, i. e. of the parts of the casing and of the plunger associated with the eccentric roller, shown in plan view.

Fig. 4 is a view similar to Fig. 3, the plunger being released so as to allow the piece of work to be removed.

Fig. 5 is an elevational view similar to Fig. 4 except for the fact that, the clamping arrangement being locked, the movable tailstock is ready for operation for instance for boring a hole through the sole operation of the hand-wheel.

Figure 1:
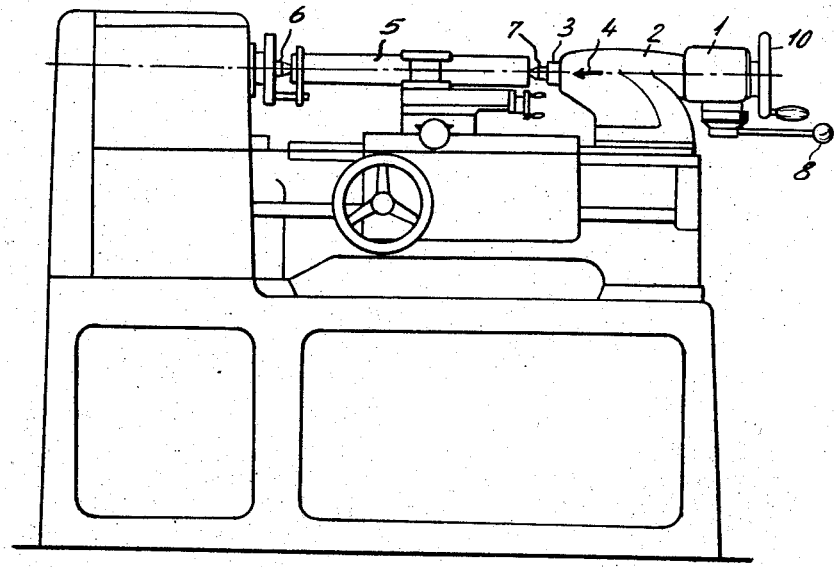
Fig. 1 is a diagrammatic elevational view of the lathe incorporating my improved arrangement, said lathe being shown as a whole.

Turning to the lathe illustrated by way of example in Fig. 1, the sleeve 3 of the movable tailstock 2 is adapted to progress in the direction of the arrow 4 for clamping the piece of work 5 between the dead center 7 of the movable tailstock and the center 6 of the stationary headstock. This progression is controlled normally by the usual hand-wheel 10 and, to allow a rapid clamping without any substantial straining of the operator, there is provided as disclosed hereinabove an auxiliary arrangement illustrated diagrammatically in Fig. 1 through its casing 1 secured to the rear of the movable tailstock 2.

This auxiliary arrangement includes a plunger 17 having a suitable cross-section and provided with a rectilinear transverse groove extending perpendicularly to the axis of the movable tailstock in the immediate vicinity of said tailstock. Inside said transverse groove may move a roller or a ball bearing 12 carried by an eccentric member 11. The latter revolves round its vertical spindle carried inside the ball bearings 23 and 24 under the action of a handle 8 mounted on said spindle. The overhanging of the eccentric member 11 is reduced to the utmost through such a mounting in a roller or ball bearing 12.

It is apparent that this rotation of the eccentric member allows a shifting of the plunger 17 between its non-clamping position illustrated in Fig. 4 and its clamping position illustrated in Fig. 3 as provided through the transverse movement imparted to the roller 12. It will be remarked that the plunger 17 is locked in its clamped position of Fig. 3 because the line connecting the center of the roller 12 with the center of the eccentric member 11 lies then slightly beyond the longitudinal axis 13 of the movable tailstock. On the other hand, the eccentric member carries on its lower surface an arcuate groove 15 arranged coaxially with the axis of said member, said groove being engaged by a stud 14 rigid with the casing 1 or with a part rigidly secured to the latter. The abutment of one end of said groove against the stationary stud 14 defines the maximum amplitude of shifting of the eccentric member beyond the point of maximum wedging on the longitudinal axis 13 as illustrated in Fig. 3.

Comparison between Figs. 3 and 4 allows ascertaining that a comparatively small shifting of the plunger under the action of the eccentric member is sufficient for clamping the piece of work through the shifting thus imparted to the dead center 7 or the movable tailstock and reversely for releasing the dead center whenever the piece of work is being changed.

The plunger 17 acts on the system driving the back center 7 through the agency of the spring 16 and of the stop ring 28 rigid in its turn with the screw 9 engaging the sleeve 3. This shifting of the dead center inside the movable tailstock under the action of the handle 8 and of the plunger 17 is thus independent of the shifting provided by the hand-wheel 10 the rotation of which produces mechanically that of the screw 9 which acts directly on the sleeve 3.

The spring 16 inserted between the auxiliary arrangement and the center 7 makes up for the unavoidable differences in length between successive pieces of work 5 of a given series or of the differences in depth between different dead centers or for the heat expansion produced by the engagement between the tool and the piece of work.

The conventional hand-wheel 10 may serve for adjusting at first the location of the sleeve 3 in a longitudinal direction and in order to prevent any misadjustment of the dead center carried by the sleeve during the subsequent high speed clamping, the hand-wheel 10 is held fast longitudinally as provided through the screwing of the screw 19 with a view to making the hand-wheel rigid with the washer 20 carrying an eccentric longitudinal rod 21 serving as a guide for the sliding of the system constituted by the hand-wheel 10 and the screw 9 inside the casing provided for this purpose with a perforation 21' (Fig. 5). The high speed clamping over a short distance may thus be obtained whatever may be the location of the sleeve 3 obtained previously through operation of the hand-wheel 10.

Figure 2:
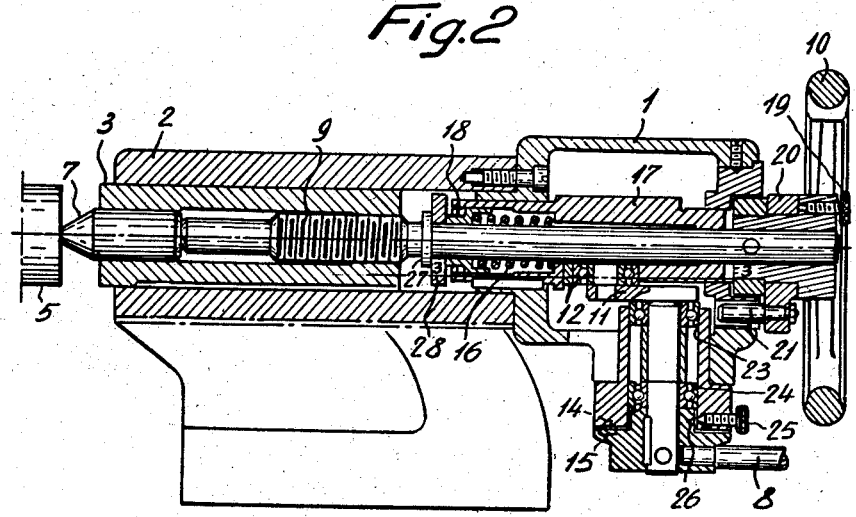
Fig. 2 is a longitudinal vertical cross-section of the movable tailstock, the piece of work being shown as held by the high speed clamping arrangement.

Reversely, when it is desired to use the hand-wheel 10 alone without resorting to the high speed clamping arrangement, the latter may be held fast after it has been returned into its inoperative position (Figs. 3 and 5) by screwing the screw 25 (Fig. 2) through an opening of the casing 1 so as to make it engage a conical depression 26 provided in the outer wall of the spindle carrying the eccentric member.

The screw 19 is then released so that it is possible henceforward to use the hand-wheel 10 in the same manner as on a conventional tailstock, for instance when drilling. This is allowed by reason of the collar 27 rigid with the shank of the control screw 9 engaging the front surface of the casing 1 as shown in Fig. 5 so as to define in an accurate manner the location of the control screw 9 with reference to the movable tailstock. The shifting of the sleeve is then operated solely through the rotation of the hand-wheel.

Of course, for executing a high speed clamping through operation of the handle 8 it is necessary to previously unscrew the screw 25 so as to release the eccentric member. The operation continues thereafter in the manner disclosed hereinabove, the plunger 17 sliding so as to shift forwardly the washer 20 which is rigid with the screw and with the hand-wheel.

What I claim is:

1. A double control system for the positioning of the back center in the tailstock of a machine-tool, comprising a casing rigid with the outer end of the tailstock, a sleeve slidingly, nonrotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section, a plunger surrounding a shank section between said stop and the handwheel and adapted to slide thereon inside the casing and, when shifted inwardly, the urge positively and bodily inwardly the stop, the shank, the sleeve and the back center, said plunger being provided with a rectilinear groove perpendicular to the axis of the shank, a spindle revolubly carried by the casing and the axis of which pass through the plunger orthogonally to the axis of the shank and to the direction of said groove, a member rigid with the said spindle at the end of the latter facing the plunger, a projection carried eccentrically by said member, engaging the groove in the plunger and adapted to progress in said groove upon rotation of the spindle to make said plunger progress inwardly as said projection progresses between an end of said groove and a point of the said groove aligned longitudinally of the shank with a point of the axis of the spidle, further progression of the projection beyond said point releasing the plunger, a stop limiting said further progression of the projection to a slight amount and hand-operable means rigid with the spindle on the outside of the casing for control of the rotary movement of the spindle and member rigid therewith.

2. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section and cooperating with the casing to define the outermost position of said shank with reference to the casing, a plunger surrounding a shank section between said stop and the handwheel and adapted to slide thereon inside the casing and, when shifted inwardly, to urge positively and bodily inwardly the stop, the shank, the sleeve and the back center, said plunger being provided with a rectilinear groove perpendicular to the axis of the shank, a spindle revolubly carried by the casing and the axis of which passes through the plunger orthogonally to the axis of the shank and to the direction of said groove, a member rigid with the said spindle at the end of the latter facing the plunger, a roller revolubly carried eccentrically by said member, engaging the groove in the plunger and adapted to progress in said groove upon rotation of the spindle to make said plunger progress inwardly as said roller progresses between an end of said groove and a point of the said groove aligned longitudinally of the shank with a point of the axis of the spindle, further progression of the roller beyond said point releasing the plunger, a stop limiting said further progression of the roller to a slight amount and hand-operable means rigid with the spindle on the outside of the casing for control of the rotary movement of the spindle and member rigid therewith.

3. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section, a plunger surrounding a shank section between said stop and the handwheel and adapted to slide thereon inside the casing and, when shifted inwardly, to urge positively and bodily inwardly the stop, the shank, the sleeve and the back center, said plunger being provided with a rectilinear groove perpendicular to the axis of the shank, a spindle revolubly carried by the casing and the axis of which passes through the plunger orthogonally to the axis of the shank and to the direction of said groove, a cam rigid with the said spindle at the end of the latter facing the plunger, engaging the groove in the plunger and adapted to progress in said groove upon rotation of the spindle to make said plunger progress inwardly as said cam progresses between an end of said groove and a point of the said groove aligned longitudinally of the shank with a point of the axis of the spindle, further progression of the cam beyond said point releasing the plunger, a stop limiting said further progression of the cam to a slight amount and hand-operable means rigid with the spindle on the outside of the casing for control of the rotary movement of the spindle and cam rigid therewith.

4. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section, a plunger surrounding a shank section between said stop and the handwheel and adapted to slide thereon inside the casing and, when shifted inwardly, to urge positively and bodily inwardly the stop, the shank, the sleeve and the back center, said plunger being provided with a rectilinear groove perpendicular to the axis of the shank, a spindle the axis of which passes through the plunger orthogonally to the axis of the shank and to the direction of said groove, roller bearings rigid with the casing and revolubly carrying said spindle, a member rigid with the said spindle at the end of the latter facing the plunger, a projection carried eccentrically by said member, engaging the groove in the plunger and adapted to progress in said groove upon rotation of the spindle to make said plunger progress inwardly as said projection progresses between an end of said groove and a point of the said groove aligned longitudinally of the shank with a point of the axis of the spindle, further progression of the projection beyond said point releasing the plunger, a stop limiting said further progression of the projection to a slight amount and a handle controlling said spindle and radially rigid therewith.

5. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section, a plunger surrounding a shank section between said stop and the handwheel, a damping spring fitted between the plunger and the stop to transmit the thrust of the plunger when shifted inwardly to said stop and thereby urge positively and bodily inwardly the shank, the sleeve and the back center, said plunger being provided with a rectilinear groove perpendicular to the axis of the shank, a spindle revolubly carried by the casing and the axis of which passes through the plunger orthogonally to the axis of the shank and to the direction of said groove, a member rigid with the said spindle at the end of the latter facing the plunger, a projection carried eccentrically by said member, engaging the groove in the plunger and adapted to progress in said groove upon rotation of the spindle to make said plunger progress inwardly as said projection progresses between an end of said groove and a point of the said groove aligned longitudinally of the shank with a point of the axis of the spindle, further progression of the projection beyond said point releasing the plunger, a stop limiting said further progression of the projection to a slight amount and hand-operable means rigid with the spindle on the outside of the casing for control of the rotary movement of the spindle and member rigid therewith.

6. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a stop rigid with the shank at a point outside its screw section, a plunger surrounding a shank section between said stop and the handwheel and adapted to slide thereon inside the casing and, when shifted inwardly, to urge positively and bodily inwardly the stop, the shank, the sleeve and the back center, said plunger being provided with a rectilinear groove perpendicular to the axis of the shank, a spindle revolubly carried by the casing and the axis of which passes through the plunger orthogonally to the axis of the shank and to the direction of said groove, means for locking said spindle against rotation, a member rigid with the said spindle at the end of the latter facing the plunger, a projection carried eccentrically by said member, engaging the grove in the plunger and adapted to progress in said groove upon rotation of the spindle to make said plunger progress inwardly as said projection progresses between an end of said groove and a point of the said groove aligned longitudinally of the shank with a point of the axis of the spindle, further progression of the projection beyond said point releasing the plunger, a stop limiting said further progression of the projection to a slight amount and hand-operable means rigid with the spindle on the outside of the casing for control of the rotary movement of the spindle and member rigid therewith.

7. A double control system for the positioning of the back center in the tailstock of a machine-tool, comprising a casing rigid with the outer end of the tailstock, a sleeve slidingly, non rotatably and coaxially fitted inside the tailstock and casing system, carrying the back center and the outer end of which is tapped, a shank extending axially of the tailstock and casing system and a section of which forms a control screw engaging the outer tapped end of the sleeve, a handwheel coaxially rigid with said shank and adapted to be rotated with reference to the casing to control the position of the sleeve inside the tailstock, a disc revolubly carried by the shank, guiding means for said disc allowing a longitudinal movement thereof with reference to the casing, releasable means rigidly interconnecting the handwheel with said disc to prevent angular shifting of the handwheel, a stop rigid with the shank at a point outside its screw section, a plunger surrounding a shank section between said stop and the handwheel and adapted to slide thereon inside the casing and, when shifted inwardly, to urge positively and bodily inwardly the stop, the shank, the sleeve and the back center, said plunger being provided with a rectilinear groove perpendicular to the axis of the shank, a spindle revolubly carried by the casing and the axis of which passes through the plunger orthogonally to the axis of the shank and to the direction of said groove, a member rigid with the said spindle at the end of the latter facing the plunger, a projection carried eccentrically by said member, engaging the groove in the plunger and adapted to progress in said groove upon rotation of the spindle to make said plunger progress inwardly as said projection progresses between an end of said groove and a point of the said groove aligned longitudinally of the shank with a point of the axis of the spindle, further progression of the projection beyond said point releasing the plunger, a stop limiting said further progression of the projection to a slight amount and hand-operable means rigid with the spindle on the outside of the casing for control of the rotary movement of the spindle and member rigid therewith.

8. A positioning and locking system for a longitudinally movable shaft, comprising a plunger shiftable over said shaft and adapted to urge the latter forwardly into a predetermined position, said plunger being provided with a rectilinear groove perpendicular to the axis of the shaft, a spindle revolubly carried by the casing and the axis of which passes through the plunger orthogonally to the axis of the shaft and to the direction of said groove, a member rigid with the said spindle at the end of the latter facing the plunger, a projection carried eccentrically by said member, engaging the groove in the plunger and adapted to progress in said groove upon rotation of the spindle to make said plunger progress inwardly as said projection progresses between an end of said groove and a point of the said groove aligned longitudinally of the shaft with a point of the axis of the spindle, further progression of the projection beyond said point releasing the plunger, a stop limiting said further progression of the projection to a slight amount and hand-operable means rigid with the spindle on the outside of the casing for control of the rotary movement of the spindle and member rigid therewith.

References Cited in the file of this patent

UNITED STATES PATENTS

| | | |
|---|---|---|
| 722,677 | Crippen et al. | Mar. 17, 1903 |
| 1,290,896 | Bryant | Jan. 14, 1919 |
| 1,373,158 | Wilcox | Mar. 29, 1921 |
| 1,501,076 | Townsend | July 15, 1924 |

FOREIGN PATENTS

| | | |
|---|---|---|
| 1,004,563 | France | Mar. 13, 1952 |